US010341077B2

(12) United States Patent
Nammi et al.

(10) Patent No.: US 10,341,077 B2
(45) Date of Patent: Jul. 2, 2019

(54) METHOD FOR REPORTING CHANNEL QUALITY INDICATORS IN A WIRELESS DEVICE AND A RADIO NETWORK NODE

(71) Applicant: Telefonaktiebolaget LM Ericsson (publ), Stockholm (SE)

(72) Inventors: Sairamesh Nammi, Bedminster, NJ (US); Andres Reial, Malmö (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 269 days.

(21) Appl. No.: 15/309,132

(22) PCT Filed: May 7, 2014

(86) PCT No.: PCT/SE2014/050556
§ 371 (c)(1),
(2) Date: Nov. 4, 2016

(87) PCT Pub. No.: WO2015/171025
PCT Pub. Date: Nov. 12, 2015

(65) Prior Publication Data
US 2017/0063513 A1    Mar. 2, 2017

Related U.S. Application Data

(63) Continuation of application No. PCT/SE2014/050556, filed on May 7, 2014.

(51) Int. Cl.
*H04L 5/00*    (2006.01)
*H04L 1/00*    (2006.01)
(Continued)

(52) U.S. Cl.
CPC .......... *H04L 5/0073* (2013.01); *H04L 1/0026* (2013.01); *H04L 1/1829* (2013.01); *H04W 72/042* (2013.01)

(58) Field of Classification Search
CPC ..... H04W 24/10; H04B 17/24; H04B 17/309; H04B 7/0417; H04B 7/0632; H04L 1/0026; H04J 11/005
See application file for complete search history.

(56) References Cited

U.S. PATENT DOCUMENTS 8,515,440 B2    8/2013  Damnjanovic et al.
2012/0076025 A1  3/2012  Barbieri et al.
(Continued)

OTHER PUBLICATIONS

Unknown, Author, "Analysis of Network Assistance for Interference Cancelation for Cell Range Expansion", 3GPP TSG RAN WG1 Meeting #74, R1-133640, Ericsson, ST-Ericsson, Barcelona, Spain, Aug. 19-23, 2013, 1-12.
(Continued)

*Primary Examiner* — Mansour Oveissi
(74) *Attorney, Agent, or Firm* — Patent Portfolio Builders, PLLC

(57) ABSTRACT

The present invention relates to a method for transmitting channel quality indicators, the method being performed in a wireless device served by a first radio network node of a wireless communication network. The wireless device receives a reference signal from the first radio network node and information relating to an interfering transmission of a second radio network node. It estimates a first channel quality based on the reference signal, and a second channel quality based on the reference signal and on the information relating to the interfering transmission, wherein the second channel quality indicates a channel quality for which the information relating to the interfering transmission, wherein the second channel quality indicates a channel quality for which the interfering transmission has been cancelled. Corresponding first and second channel quality indicators are determined and transmitted to the first radio network node.

12 Claims, 12 Drawing Sheets

(51) Int. Cl.
*H04L 1/18* (2006.01)
*H04W 72/04* (2009.01)

(56) References Cited

U.S. PATENT DOCUMENTS

2014/0003267 A1 1/2014 Yoo et al.
2015/0282192 A1* 10/2015 Shin .................. H04W 72/082
370/329

OTHER PUBLICATIONS

Unknown, Author, "Heterogeneous Network Deployment Scenarios", Ericsson, 3GPP TSG-RAN WG1 #70bis, R1-124513, San Diego, CA, Oct. 8-12, 2012, 1-3.
Unknown, Author, "Initial considerations on Heterogeneous Networks for UMTS", Ericsson, ST-Ericsson, 3GPP TSG RAN WG1 Meeting #70bis, R1-124512, San Diego, CA, USA, Oct. 8-12, 2012, 1-7.
Unknown, Author, "On Studying Network Assisted IC in HetNets", 3GPP TSG RAN WG1 Meeting #72bis, R1-131577, Qualcomm Incorporated, Chicago, USA, Apr. 15-19, 2013, 1-6.
Unknown, Author, "Proposed SID: Study on UMTS Heterogeneous Networks", TSG RAN Meeting #57, RP-121436, Huawei, HiSilicon, Chicago, USA, Sep. 4-7, 2012, 1-6.

* cited by examiner

| HARQ ACK/NAK | CQI | HARQ ACK/NAK | CQI | HARQ ACK/NAK | CQI |
|---|---|---|---|---|---|

| HARQ ACK/NAK | Type A + Type B CQI | HARQ ACK/NAK | Type A + Type B CQI |
Fig. 6a
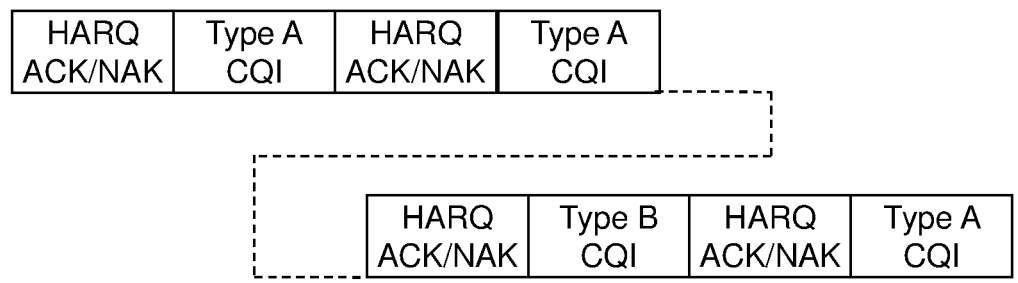
Fig. 6b
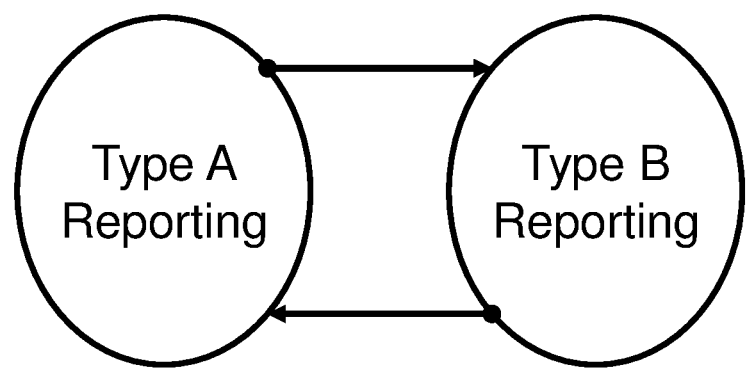
Fig. 6c

METHOD FOR REPORTING CHANNEL QUALITY INDICATORS IN A WIRELESS DEVICE AND A RADIO NETWORK NODE

TECHNICAL FIELD

The disclosure relates to Channel Quality Indicator (CQI) reporting, and more specifically to a wireless device performing a method for transmitting CQIs, to a radio network node performing a method for determining downlink scheduling parameters based on the CQIs, and to the methods as such.

BACKGROUND

3rd Generation Partnership Project (3GPP) Long Term Evolution (LTE) is the fourth-generation mobile communication technologies standard developed within the 3GPP to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a Radio Base Station (RBS) commonly referred to as a NodeB (NB) in UMTS, and as an evolved NodeB (eNodeB) in LTE. An RBS is a general term for a radio network node capable of transmitting radio signals to a UE and receiving signals transmitted by a UE.

The most common form of UMTS makes use of Wideband Code Division Multiple Access (WCDMA), which is an air interface standard that is a compulsory feature of any wireless device of the UTRAN. High Speed Downlink Packet Access (HSDPA) and High Speed Uplink Packet Access (HSUPA), together referred to as High Speed Packet Access (HSPA), are mobile communication protocols that were developed to cope with higher data rates than original WCDMA protocols were capable of.

FIG. 1a illustrates a radio access network with an RBS 101 that serves a UE 103 located within the RBS's geographical area of service, called a cell 105. In UMTS, a Radio Network Controller (RNC) 106 controls the RBS 101 and other neighboring RBSs, and is, among other things, in charge of management of radio resources in cells for which the RNC is responsible. The RNC is in turn also connected to the core network (not illustrated). FIG. 1b illustrates a radio access network in an LTE system. An eNodeB (eNB) 101a serves a UE 103 located within the RBS's geographical area of service or the cell 105a. The eNodeB 101a is directly connected to the core network (not illustrated). The eNodeB 101a is also connected via an X2 interface to a neighboring eNodeB 101b serving another cell 105b.

During the last few years, cellular operators have started to offer mobile broadband based on WCDMA/HSPA. Further, fuelled by new wireless devices designed for data applications, the end user performance requirements are steadily increasing. The large uptake of mobile broadband has resulted in that traffic volumes that need to be handled by the HSPA networks have grown significantly. Therefore, techniques that allow cellular operators to manage their spectrum resources more efficiently are of large importance.

Some techniques which make it possible to improve the downlink performance are 4-branch Multiple-Input-Multiple-Output (MIMO), multi-flow communication, and multi-carrier deployment. Since improvements in spectral efficiency per link are approaching theoretical limits, the next generation technology is about improving the spectral efficiency per unit area. In other words, the additional features for HSDPA need to provide a uniform user experience to users anywhere inside a cell by changing the topology of traditional networks. Currently 3GPP has been working on this aspect of using heterogeneous networks.

A homogeneous network is a network of radio network nodes, such as RBSs, NodeB, Remote Radio Heads (RRH), and Remote Radio Units (RRU), in a planned layout and a collection of user terminals. In the homogeneous network all radio network nodes have similar transmit power levels, antenna patterns, and receiver noise floors, as well as similar backhaul connectivity to the data network. In other words they are all belonging to a same base station power class. For example, all of them are either high power nodes (HPN) or low power nodes (LPN). An example of a HPN is a wide area RBS serving a macro cell. An example of a LPN is a local area RBS serving a pico cell. In other words a homogeneous network is a single tier system. Moreover, all RBSs offer unrestricted access to user terminals in the network, and serve roughly the same number of user terminals. Current wireless systems such as WCDMA, HSPA, and LTE fall under this category.

In heterogeneous networks several LPNs 202 such as micro, pico, femto, or relay base stations are deployed in addition to the planned or regular placement of HPNs 201 such as wide area RBSs serving macro cells 203, as shown in FIG. 2a. Therefore a heterogeneous network is at least a 2-tier system. Note that the power transmitted by these micro, pico, femto, or relay base stations is relatively small compared to that of macro base stations. A LPN may transmit at a power which can be up to 2 W, as compared to that of 40 W for macro base stations. The LPNs are often deployed to eliminate coverage holes in the homogeneous network. Hence they improve the capacity in hot-spots. Due to their lower transmit power and smaller physical size, LPNs can offer flexible site acquisitions.

The LPN cells in a cluster of heterogeneous nodes of a heterogeneous network may have different cell identifiers from that of HPN cells which means that they are viewed as different cells. Alternatively, they can have same cell identifiers as that of HPN cells. Such cells are sometimes referred to as soft, shared, or combined cells, or cluster with common cell identifiers.

FIG. 2b shows the heterogeneous network where LPNs 202 and HPNs 201 create separate cells 204 and 203 respectively, i.e. with different cell identifiers illustrated by the dotted cell 206 and 205 overlaid the illustration of the actual cell coverage 204 and 203. Simulations show that using LPNs in a macro cell offers load balancing, hence enabling large gains in system throughout as well as cell edge user throughput. One disadvantage with each cell creating a different cell is that a UE needs to do soft handover when moving from an LPN cell to a HPN cell or to another LPN cell. Hence higher layer signaling is needed to perform the handover.

FIG. 2c illustrates a heterogeneous network where LPN cells are part of the HPN cells, i.e. share cell identifier illustrated by the dotted cell 205 overlaid the illustration of the actual macro cell coverage 207. This set-up avoids frequent soft handovers and hence higher layer signaling. In the deployment of FIG. 2c, all the nodes are coupled to a central node, which in this case is a HPN 201. In a typical deployment scenario the LPNs are connected to a central controller via a high speed data link. The central controller in the combined cell takes responsibility for collecting operational statistics information of network environment measurements. The decision of what nodes that should transmit to a specific UE is made by the central controller, possibly based on information provided by the UE. The cooperation among various nodes is instructed by the central controller and implemented in a centralized way. The central controller is one of the network nodes, e.g. the HPN.

Even though large gains in terms of average sector throughput are achieved with the introduction of LPNs, the interference structure becomes more complex in heterogeneous networks. For example when a UE is served by an LPN, individual UE link throughput is impacted due to the interference caused by the HPN. FIG. 3a shows the link performance when a UE which is scheduled by an LPN experiences a strong interference from a HPN such as a macro RBS which is serving another UE. The interference due to other nodes than the interfering HPN is modeled as white noise. The diagram of FIG. 3a illustrates the performance degradation that occurs when the UE is in the vicinity of a strongly interfering HPN or macro node. In the diagram, the values for link throughput is plotted for different interference situations, given by an Ioc value that determines how strong the interfering signal from the macro node is compared to the signal strength from the serving cell. Ioc=0 dB means that the interfering signal is equal to the serving cell signal, and Ioc=20 dB means that the interfering signal is 20 dB stronger than the serving cell signal. The performance loss is in the range of 100% at high geometries, i.e. for the highest value of Ioc.

Overview of Network Assisted Interference Cancellation (NAIC)

Range expansion is a technique in heterogeneous networks where user terminals are offloaded to LPNs even though they experience better downlink reception from the HPN or the macro RBS, thereby achieving load balancing gains. However, the performance of user terminals which are connected to LPNs is then impacted due to strong interference from the HPN. The HPN is in this case referred to as the aggressor node. It can be seen that significant performance gains can be achieved if the UE knows about signal format information of the interfering signals and thus can cancel the interference. This method is referred to as NAIC. FIG. 3b shows the link performance in terms of throughput when the network signals scheduling information for an interfering transmission from the aggressor HPN in accordance with a NAIC procedure. In the simulation behind the measurement results depicted in the diagram of FIG. 3b, the interfering signal is re-constructed at the UE receiver and the interference is then removed prior to detecting the serving cell signal. The macro node interference is in this example scenario 20 dB stronger than the LPN desired signal, i.e. Ioc=20 dB.

FIG. 3b shows a simulated link performance when the network signals the scheduling information of the interferer. In the simulation, the interference signal was re-constructed at the UE receiver and the interference was removed prior to detecting the serving cell signal. It can be seen from FIG. 3b that significant performance gains can be achieved if the UE knows the signal format information about the interfering signals.

For HSDPA, a transport layer channel, High-Speed Downlink Shared Channel (HS-DSCH), is implemented by three physical layer channels: High Speed-Shared Control Channel (HS-SCCH), Uplink High Speed-Dedicated Physical Control Channel (HS-DPCCH), and High Speed-Physical Downlink Shared Channel (HS-PDSCH). The HS-SCCH informs the UE that data will be sent on the HS-DSCH, 2 slots ahead. The HS-DPCCH carries acknowledgment information and current channel quality indicator (CQI). This is then used by the base station to calculate how much data to send to the UE on the next transmission. The HS-PDSCH is the channel to which the above HS-DSCH transport channel is mapped that carries actual user data. The Common Pilot Channel CPICH carries the broadcasted pilot signal identifying the NodeB cell. FIG. 4 is a signaling diagram illustrating the message sequence used for conveying the scheduling information or the network assistance information of the aggressor NodeB 402 to the wireless device 403 served by NodeB 401 in a HSPA network. The scheduling information may be conveyed by a common HS-SCCH order from the aggressor NodeB 402. Alternatively, the network assistance information may be conveyed through a broadcast channel. The channels conveying network assistance information such as the HS-SCCH may be referred to as network assisted control channels.

The network assisted control channel may contain either of the following network assistance information:

1. Scheduling information for the interfering downlink transmission by the aggressor node. In one solution, the HS-SCCH order consists of bits indicating that it is an order for informing about the scheduling information from the aggressor node. The scheduling information comprises modulation, transport block size information, and spreading codes, i.e. orthogonal variable spreading factor (OVSF) codes used at the scheduling of the interfering transmission. The scheduling information may additionally comprise pre-coding and rank information when the aggressor node applies MIMO transmissions.
2. An identifier of the UE to which the aggressor node has scheduled a transmission that interferes with the LPN nodes transmission to the victim UE. In this case, the aggressor node conveys the identifier of a scheduled UE such that the victim UE can decode the HS-SCCH of the aggressor node directed to this UE and thereby retrieve the corresponding scheduling information of the interfering transmission.

Alternatively, the network assistance information may be conveyed through a broadcast channel. The channels conveying network assistance information such as the HS-SCCH may be referred to as network assisted control channels.

Instead of sending the broadcast control channel, the RNC can pre-configure the NodeB and the UE with restricted resources. For example, it can restrict the NodeB to schedule only a subset of channelization codes, a subset of modulation codes and/or a subset of Transport Block (TB) sizes in specific Transmission Time Intervals (TTIs). This way, the UE knows the modulation and channelization code set and/or TB size of the interferer, and it can reconstruct the interference signal and subtract it from the received signal, thereby at least partially removing the interference. With this NAIC using restricted resources, the cancellation may be performed more robustly.

FIG. 5a is a signaling diagram illustrating the message sequence during typical data call set up between NodeB and the UE. From the Common Pilot Channel (P-CPICH), the UE estimates the channel and computes the CQI. This information along with Hybrid Automatic Repeat reQuest (HARQ) ACKnowledgement/Negative ACKnowledgement (ACK/NACK) information is reported to NodeB using High Speed-Dedicated Physical Control Channel (HS-DPCCH). The minimum periodicity of HS-DPCCH is one subframe (2 ms) and the actual value of this period is configured by the RNC through Radio Resource Control (RRC) signaling.

Once the Node-B receives this information, it allocates the required channelization codes, modulation and coding to the UE after scheduling. This information is conveyed to UE by High Speed-Shared Control Channel (HS-SCCH). Once the UE detects the HS-SCCH, downlink transmission starts through data traffic channel using High Speed-Physical Downlink Shared Channel (HS-PDSCH).

The conventional structure of HS-DPCCH for a single carrier is illustrated in FIG. 5b, showing how the HARQ ACK/NACK information and the CQI are alternatingly signaled. It should be noted that CQI reporting is conveyed using 5 bits representing a specific modulation, a specific transport block size (code rate) and a number of channelization codes. These 5 bits are coded using Reed Muller code and produce a 20-bit code word, i.e. the 5 bits are mapped to (20, 5) code block. For single carrier, the 20 encoded bits are spread using SF-256 and transmitted to the NodeB. For multi carrier, SF-128 is used in some cases.

In view of the above, a scheduling is desirable that efficiently accounts for the interference cancellation (IC) at the US served by an LPN.

SUMMARY

It is therefore an object to address the technical challenges outlined above, and to achieve higher gains using NAIC. This object and others are achieved by the methods, the wireless device, and the radio network node according to the independent claims, and by the embodiments according to the dependent claims.

In accordance with a first aspect, a method for transmitting channel quality indicators is provided. The method is performed in a wireless device served by a first radio network node of a wireless communication network. The method comprises receiving a reference signal from the first radio network node, and receiving information relating to an interfering transmission of a second radio network node from the wireless communication network. The method further comprises estimating a first channel quality based on the reference signal, wherein the first channel quality indicates a channel quality for which the wireless device has not cancelled the interfering transmission from the second radio network node, and estimating a second channel quality based on the reference signal and on the information relating to the interfering transmission, wherein the second channel quality indicates a channel quality for which the wireless device has cancelled the interfering transmission from the second radio network node. Additionally, the method comprises determining a first channel quality indicator based on the first channel quality and a second channel quality indicator based on the second channel quality, and transmitting the first and the second channel quality indicators to the first radio network node.

In accordance with a second aspect, a method is provided for determining downlink scheduling parameters for a transmission of data to a wireless device provided with information relating to an interfering transmission of a second radio network node. The method is performed in a first radio network node of a wireless communication network serving the wireless device and the method comprises transmitting a reference signal to the wireless device and receiving a first channel quality indicator and a second channel quality indicator from the wireless device. The first channel quality indicator is based on the reference signal and indicates a channel quality for which the wireless device has not cancelled the interfering transmission from the second radio network node, and the second channel quality indicator is based on the reference signal and on the information relating to the interfering transmission and indicates a channel quality for which the wireless device has cancelled the interfering transmission from the second radio network node. The method further comprises determining downlink scheduling parameters for a transmission of data to the wireless device based on one of the first and second channel quality indicators.

In accordance with a third aspect, a wireless device for being served by a first radio network node of a wireless communication network is provided. The wireless device is configured to receiving a reference signal from the first radio network node and receiving information relating to an interfering transmission of a second radio network node from the wireless communication network. The wireless device is further configured to estimating a first channel quality based on the reference signal, wherein the first channel quality indicates a channel quality for which the wireless device has not cancelled the interfering transmission from the second radio network node, and estimating a second channel quality based on the reference signal and on the information relating to the interfering transmission, wherein the second channel quality indicates a channel quality for which the wireless device has cancelled the interfering transmission from the second radio network node. Additionally, the wireless device is configured to determining a first channel quality indicator based on the first channel quality and a second channel quality indicator based on the second channel quality, and transmitting the first and the second channel quality indicators to the first radio network node.

In accordance with a fourth aspect, a first radio network node for a wireless communication network configured to serve a wireless device provided with information relating to an interfering transmission of a second radio network node is provided. The first radio network node is configured to transmitting a reference signal to the wireless device, and receiving a first channel quality indicator and a second channel quality indicator from the wireless device. The first channel quality indicator is based on the reference signal and indicates a channel quality for which the wireless device has not cancelled the interfering transmission from the second radio network node, and the second channel quality indicator is based on the reference signal and on the information relating to the interfering transmission and indicates a channel quality for which the wireless device has cancelled the interfering transmission from the second radio network node. The first radio network node is further configured to determining downlink scheduling parameters for a transmission of data to the wireless device based on one of the first and second channel quality indicators.

An effect of the above aspects of the invention is that higher gains can be achieved using NAIC. The UE can feed back the suitable CQI, such that the NodeB can schedule the UE with proper modulation and TB sizes in the specific TTIs accounting for the interference cancellation (IC) at the UE served by the LPN. This has the advantage that a more efficient scheduling is achieved, thus allowing for increased data rates and improved link and system performance.

Other objects, advantages and features of embodiments will be explained in the following detailed description when considered in conjunction with the accompanying drawings and claims.

BRIEF DESCRIPTION OF THE DRAWINGS

FIGS. 6a-c are schematic illustrations of channels conveying a CQI according to embodiments of the invention.

DETAILED DESCRIPTION

Figure 1A:
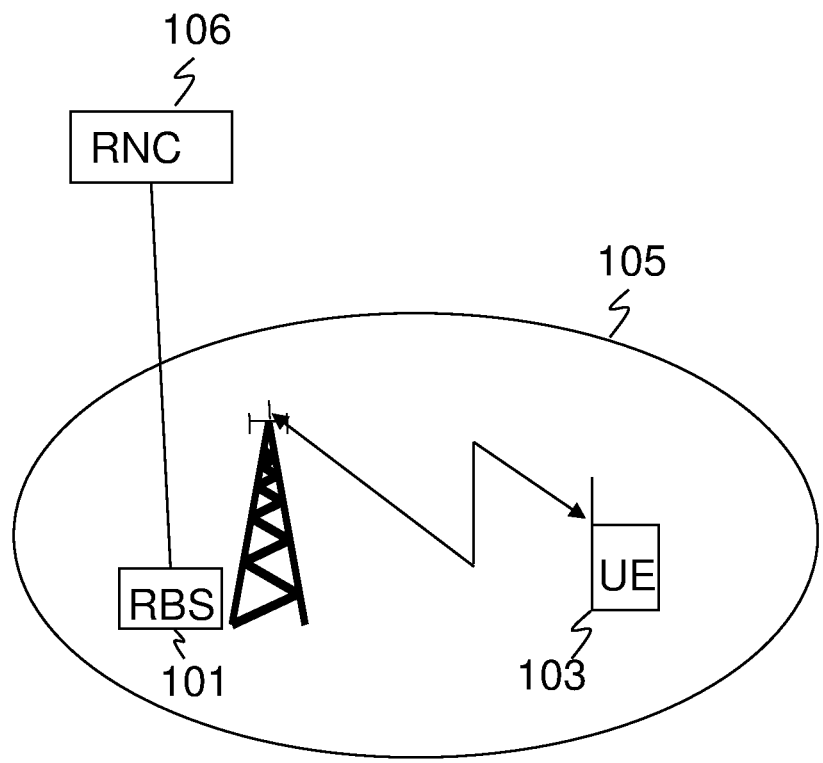
FIG. 1a is a schematic illustration of a WCDMA/HSPA radio network in which the present invention may be applied.
Figure 1B:
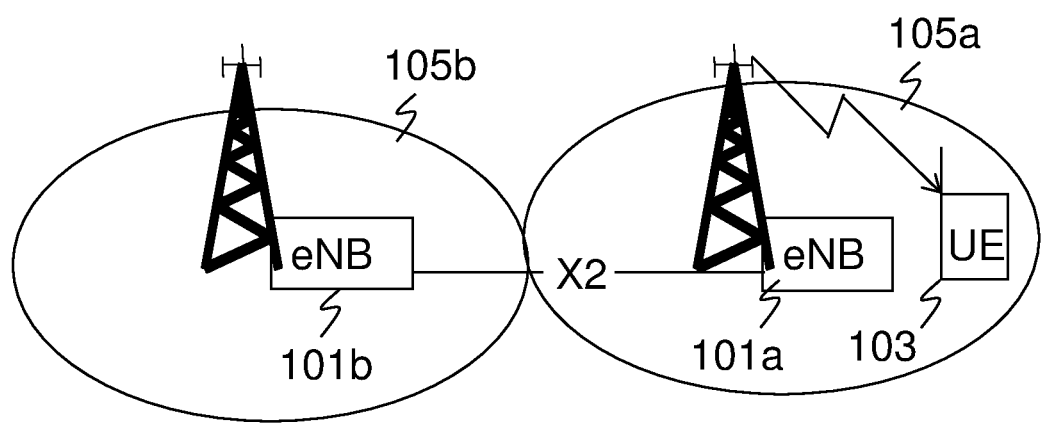
FIG. 1b is a schematic illustration of a UTRAN in which the present invention may be applied.
Figure 2A:
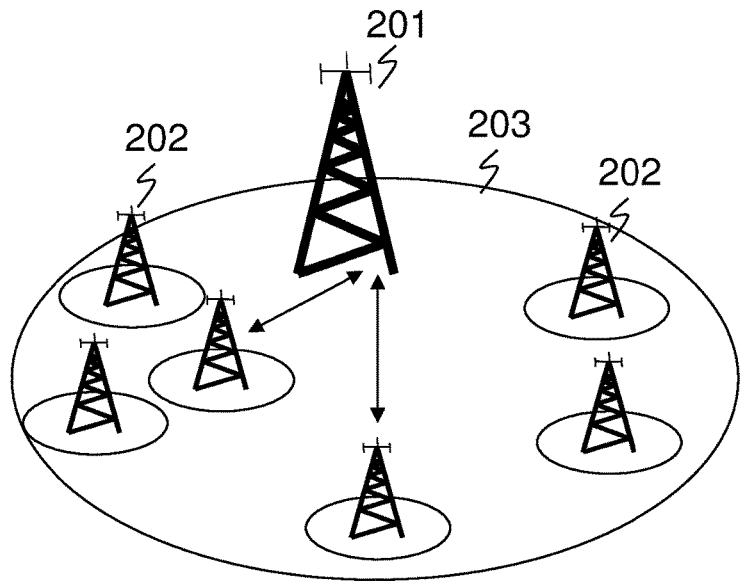
FIGS. 2a-c are block diagrams schematically illustrating example deployments of heterogeneous networks.
Figure 2B:
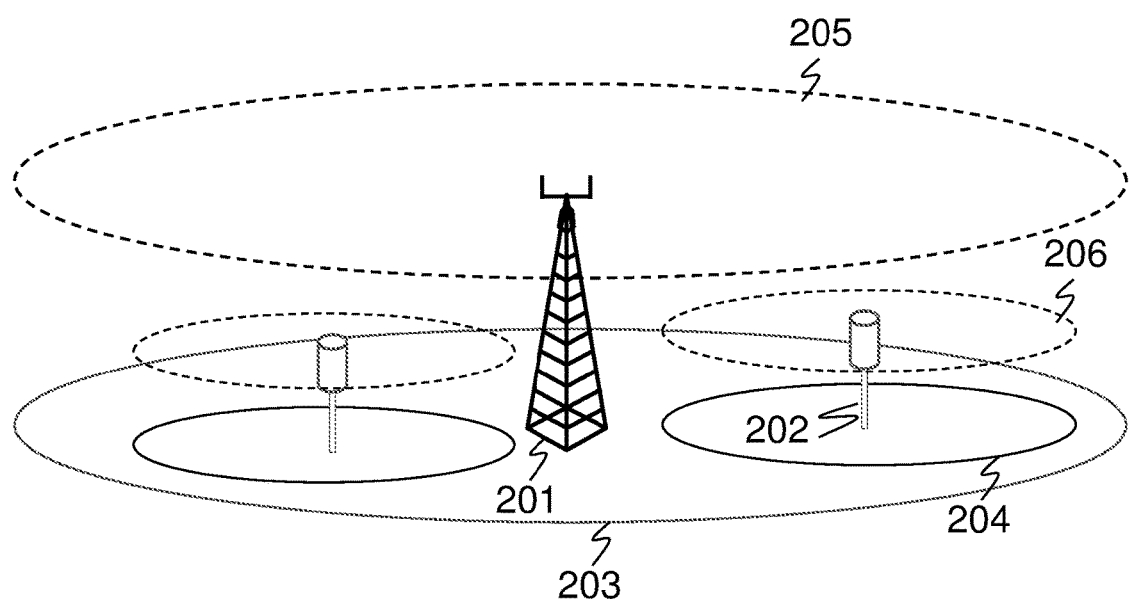
Figure 2C:
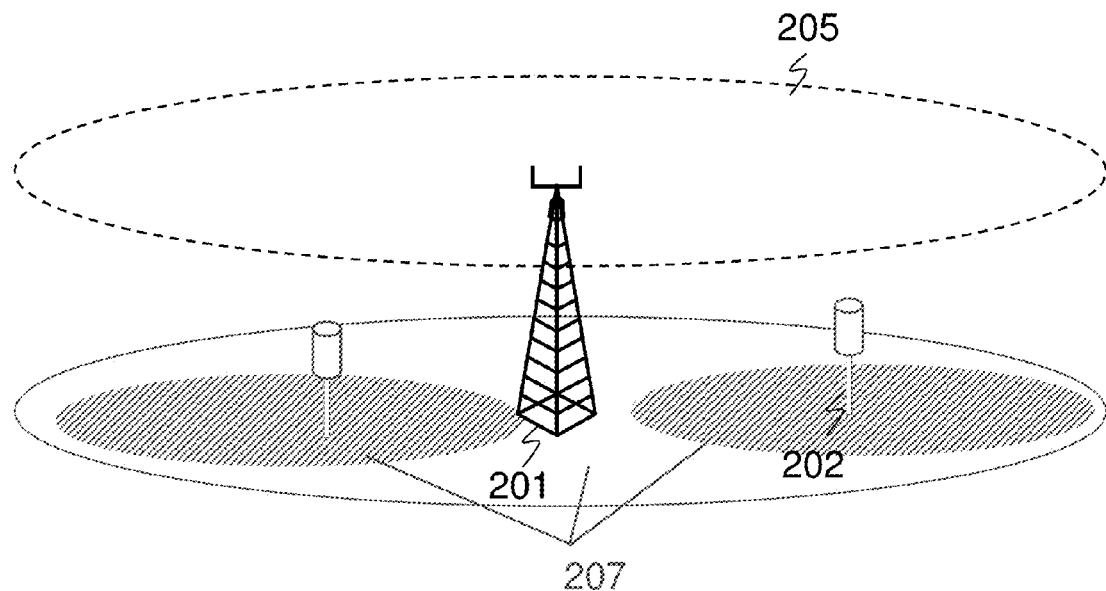
Figure 3A:
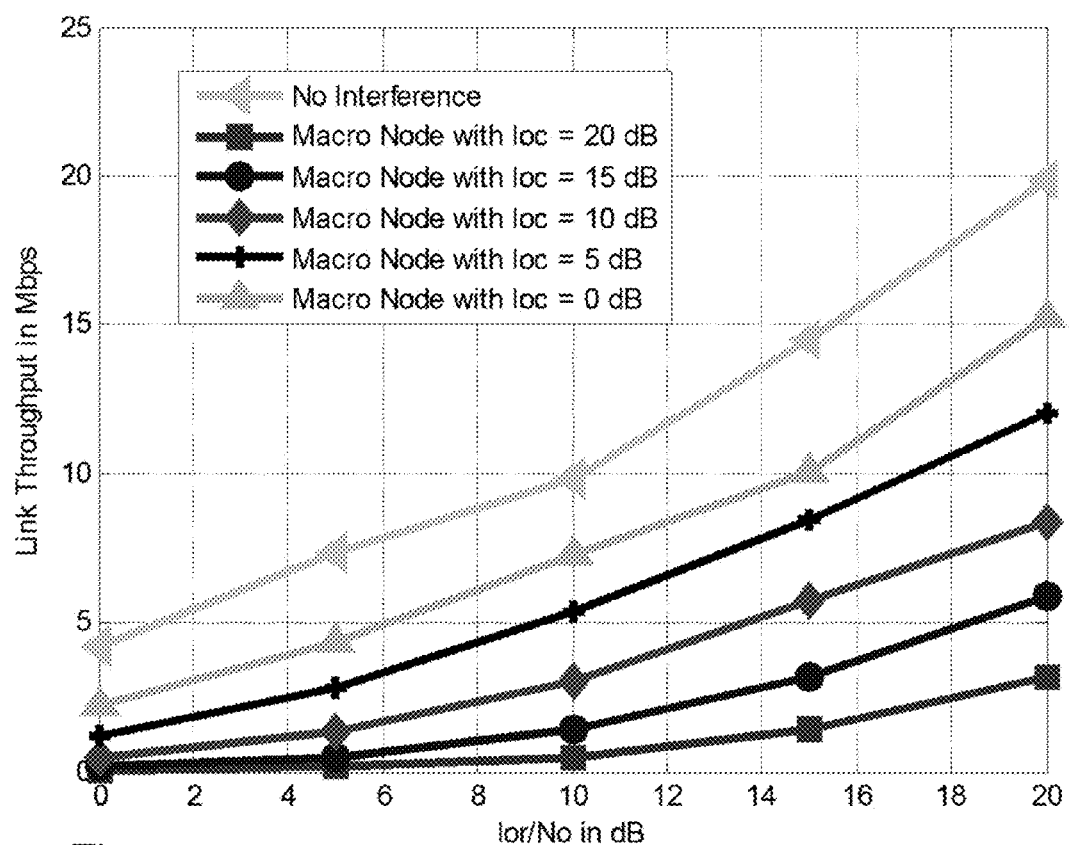
FIG. 3a is a diagram schematically illustrating the link throughput degradation for a victim UE due to aggressor node interference.
Figure 3B:
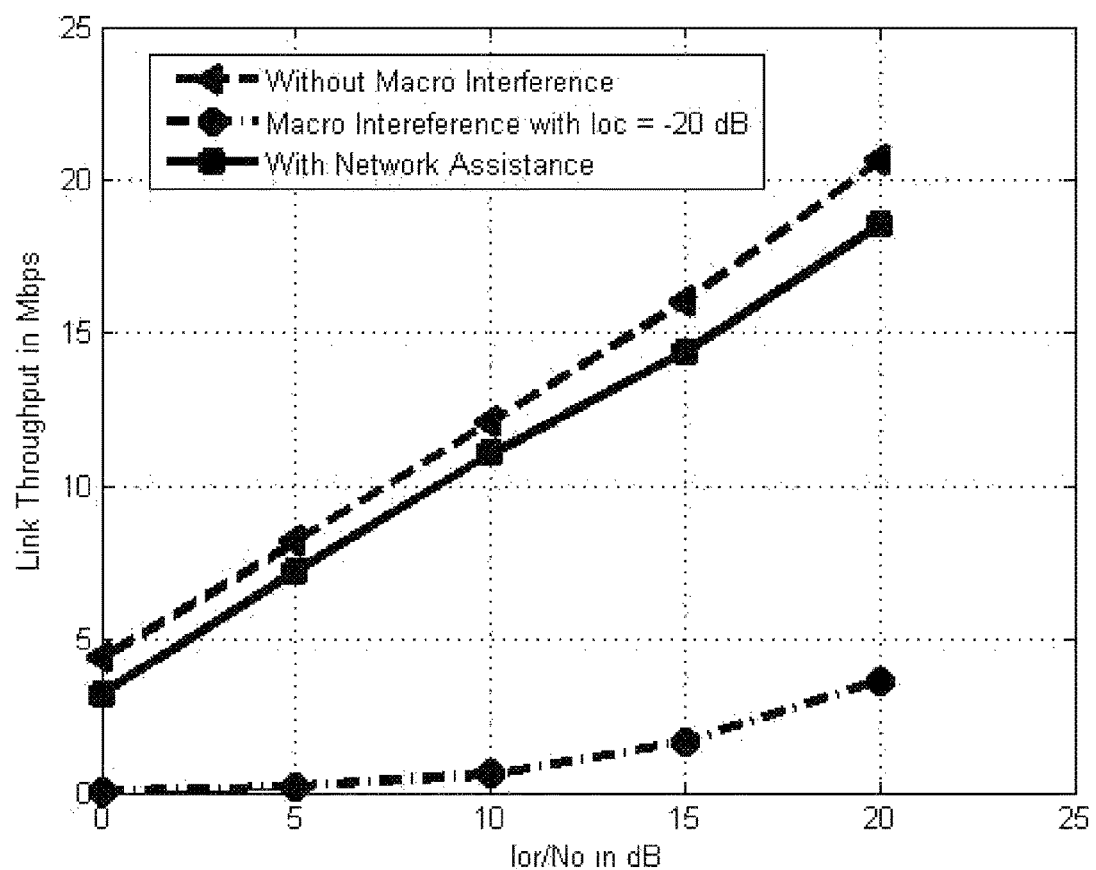
FIG. 3b is a diagram schematically illustrating link throughput improvement when using NAIC.
Figure 4:
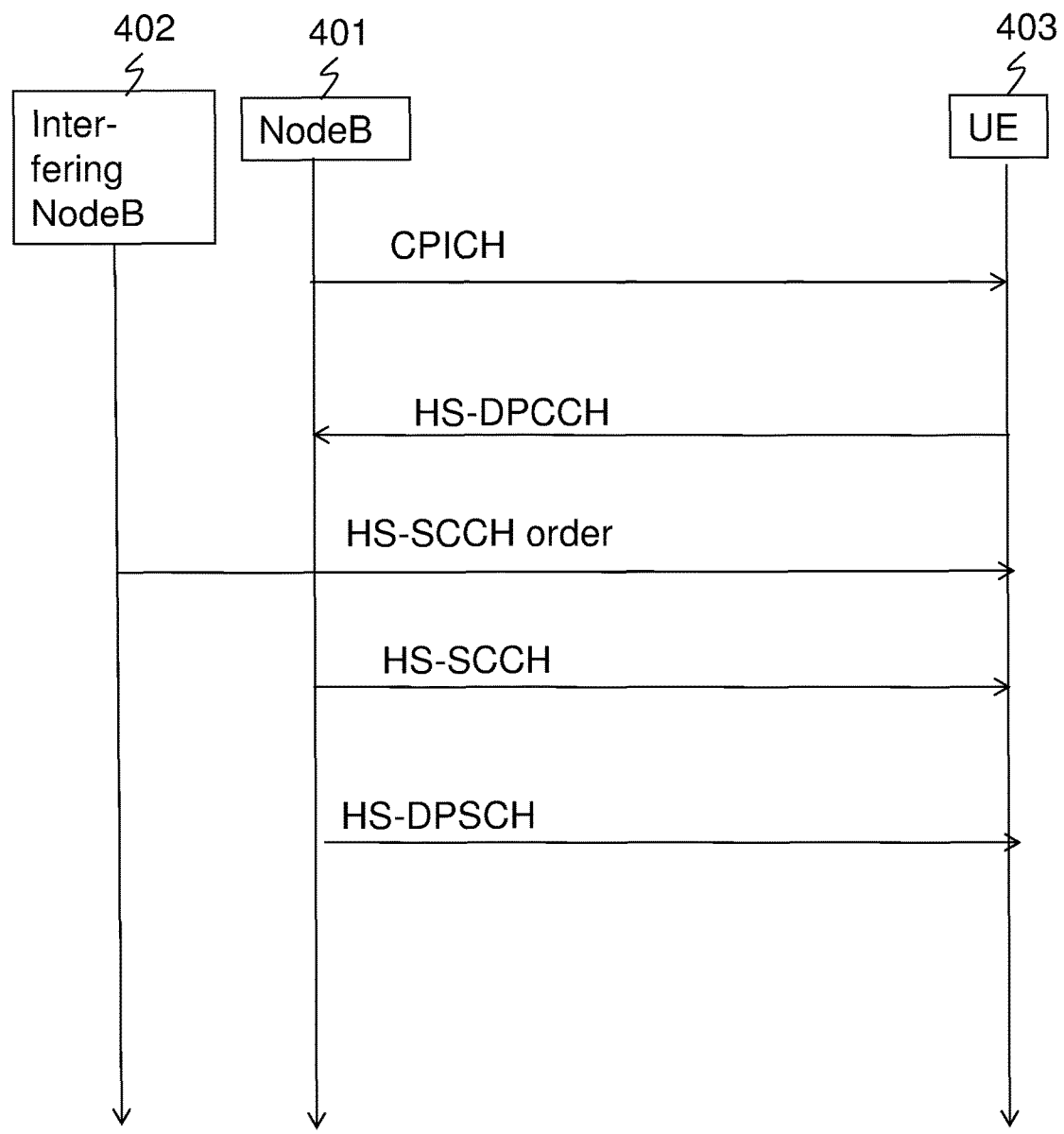
FIG. 4 is a signaling diagram illustrating the message sequences used for conveying network assistance information.
Figures 5A, 5B:
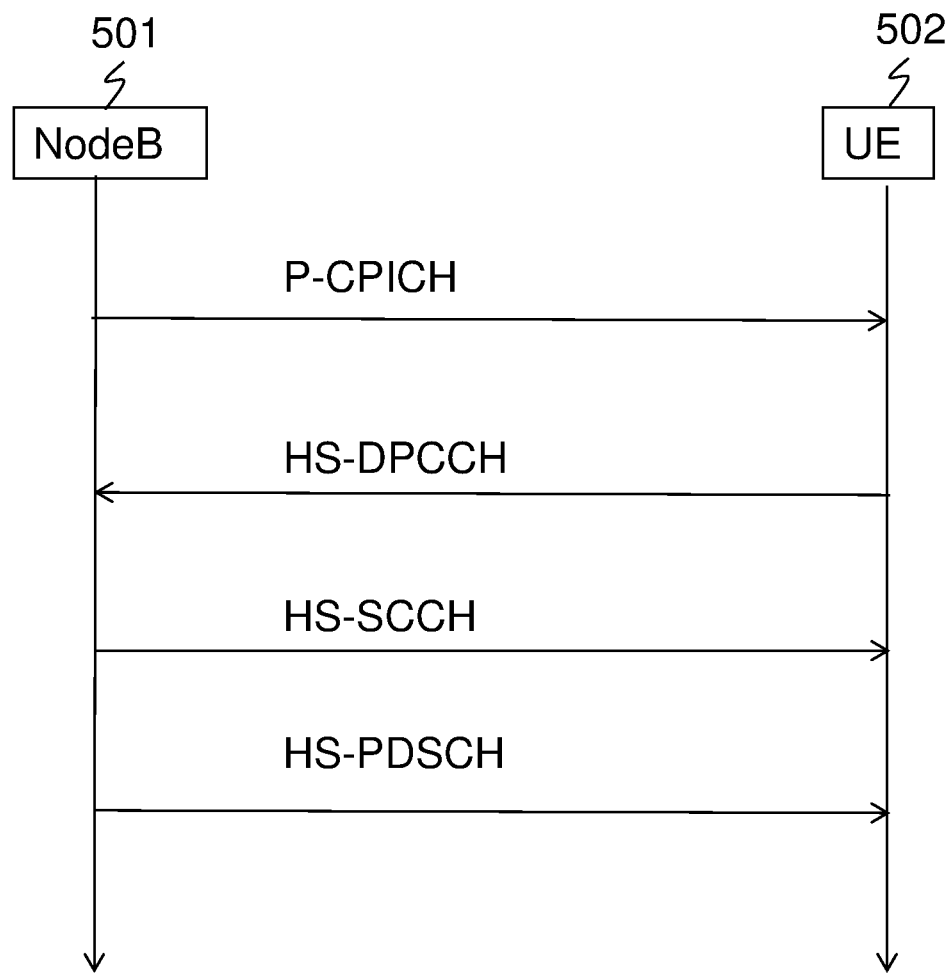
FIG. 5a is a signaling diagram illustrating the message sequences conventionally used for conveying CQI reports.
FIG. 5b is a schematic illustration of a conventional channel conveying a CQI.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to an example scenario in a HSPA heterogeneous radio network, where an aggressor HPN transmission interferes with an LPN transmission to a wireless device. However, it should be noted that the embodiments may be applied to any network technology supporting NAIC such as the LTE technology. Furthermore, the network can be a homogeneous network deployment as well as any kind of heterogeneous network deployment where the downlink transmission of one node interferes with a downlink transmission of another node, such as any co-channel or combined cell deployment scenario.

In embodiments of the invention, the problem of providing a more efficient scheduling with network assistance is addressed by using two types of reporting, here called Type A and Type B reporting.

In Type A reporting, the UE reports the CQI to indicate the highest supported transport format by the UE according to the current channel conditions, i.e. corresponding to conventional CQI reporting without interference cancellation. In Type B reporting, the UE reports the CQI to indicate the highest supported transport format by the UE according to the current channel conditions assuming that the UE cancels the interference using network assistance.

For Type A reporting, the SINR for the link between LPN to the victim UE can be expressed as $$SINR(LPN) = \frac{\gamma P_{LPN}}{\alpha_{LPN} P_{LPN} + P_{Macro} + N},$$

where $P_{LPN}$ and $P_{Macro}$ are the received power levels from the LPN and macro BS, respectively, N is the power from other cells plus thermal noise, $\alpha_{LPN}$ is the so-called orthogonality factor accounting for the fact that some own-cell interference is reduced due to the use of Orthogonal Variable Spreading Factor (OVSF) codes, and $\gamma$ represents the power allocation factor for one HS-PDSCH code.

For Type B reporting, the interference from the macro BS may be reduced by $\rho P_{Macro}$, where the coefficient $\rho$ is often referred to as the cancellation efficiency. Thus, the SINR after IC can be expressed as $$SINR_{IC}(LPN) = \frac{\gamma P_{LPN}}{(\alpha_{LPN} P_{LPN} + P_{Macro} + N) - \rho P_{Macro}}$$

The UE may use different approaches to assume the value of $\rho$, e.g. it may use an arbitrary predetermined value, the actual cancellation efficiency value obtained during recent TTIs, or a worst-case cancellation efficiency value (i.e. assuming the highest Transport Format) for the macro cell under the current channel conditions.

Hereinafter, different embodiments of how to convey the two types of CQIs are described.

Embodiment A

In a first embodiment A, the UE reports the two types CQIs in the same TTI, i.e. in a simultaneous transmission. This is schematically illustrated in FIG. 6a, showing an example of a suitable the HS-DPCCH structure for the reporting. Instead of 5 bits, as in common CQI reporting, 5+5 bits are used to report the CQIs of Type A and Type B. The order of the two types in the TTI may be different. For example, Type A may be followed by type B in a first TTI, and Type B may be followed by Type A in a subsequent second TTI. The UE may use (20, 10) block code to encode the 5+5 bits. It should be noted that for MIMO in Release 7, a UE uses (20, 10) block code to encode CQI/PCI. Thus, the same circuitry can be used, which will minimize the standard changes and standardization effort in employing the CQI reporting.

Embodiment B

In a second embodiment B, the UE reports the two different CQI in two different intervals, as is schematically illustrated in FIG. 6b, showing an example of a suitable the HS-DPCCH structure for the reporting. Hence, in any TTI only 5 bits are needed to report the CQI. The exact periodicity of the reports may be pre-configured by RNC through RRC signaling. For example, the RRC signaling may be defined by a ratio formed between the Type A CQI reports and the Type B CQI reports. That ratio may for example be 1/10 or 2/3, where the ratio 1/10 indicates that in a frame of 10 reports, one is of Type B and the remaining nine of Type A, and the ratio 2/3 indicates that in a frame of three reports, two are of type B and the one remaining of type A.

Embodiment C

In the third embodiment C, UE uses conventional HS-DPCCH reporting for conveying the two types of CQIs. However, the NodeB can signal to the UE to transmit the Type B CQI reporting for certain TTIs. In a variants of this embodiment, the NodeB can signal the UE to transmit the Type A CQI reporting for certain TTIs, or until it is ordered to transmit the Type B CQI reporting as schematically illustrated in FIG. 6c, showing the switching between the reporting of the two different types. The decision at Node B to send an order may depend on the UE type, load of the cell, power allocation of the channels, and/or location of the UE.

Embodiment D

In the fourth embodiment D, the UE uses a reporting similar to the reporting in embodiment C, with the difference that instead of sending an order from the Node B to the UE, the Node B conveys this information to the RNC, and RNC configures or reconfigures the UE through RRC signaling.

Figure 7A:
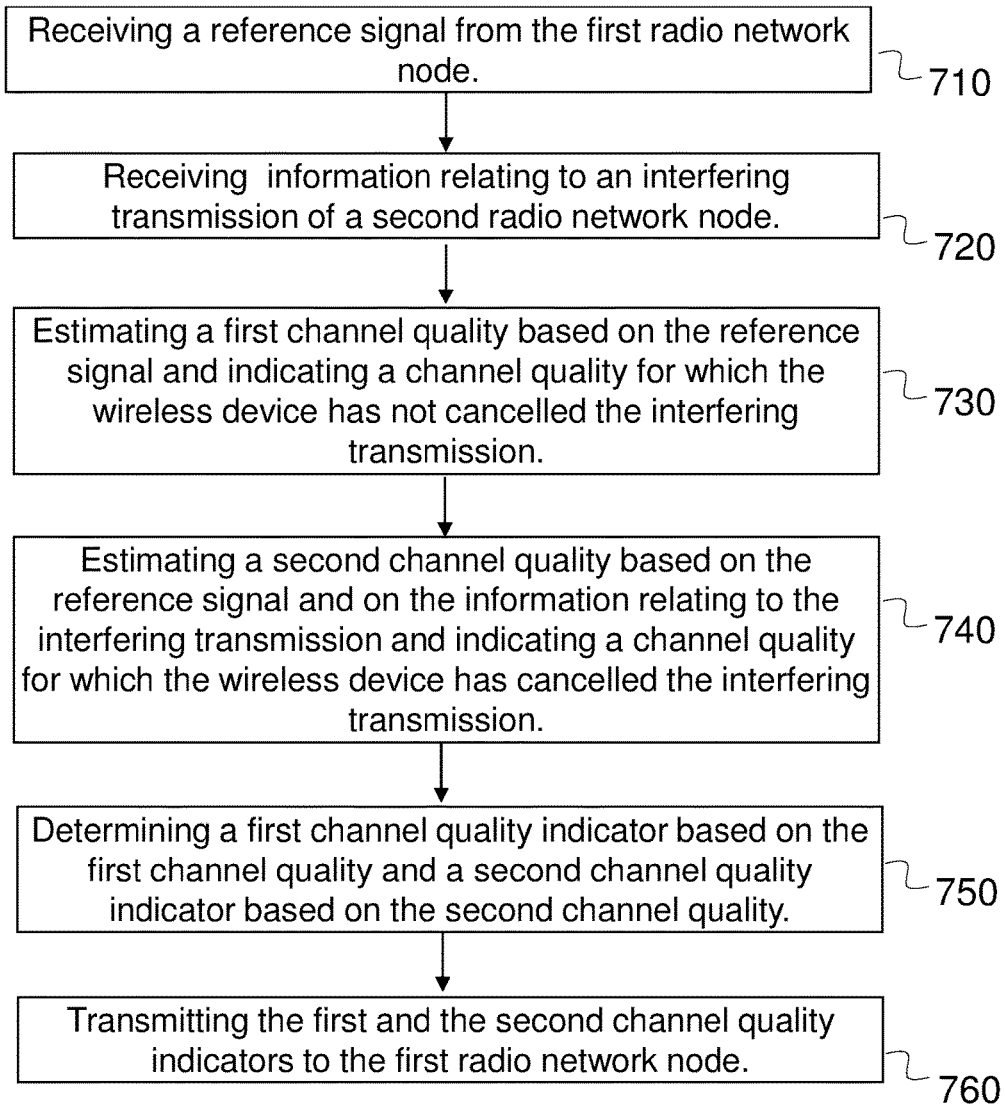
FIGS. 7a-b are flow-charts illustrating the method performed in the wireless device according to the embodiments.
Figure 8A:
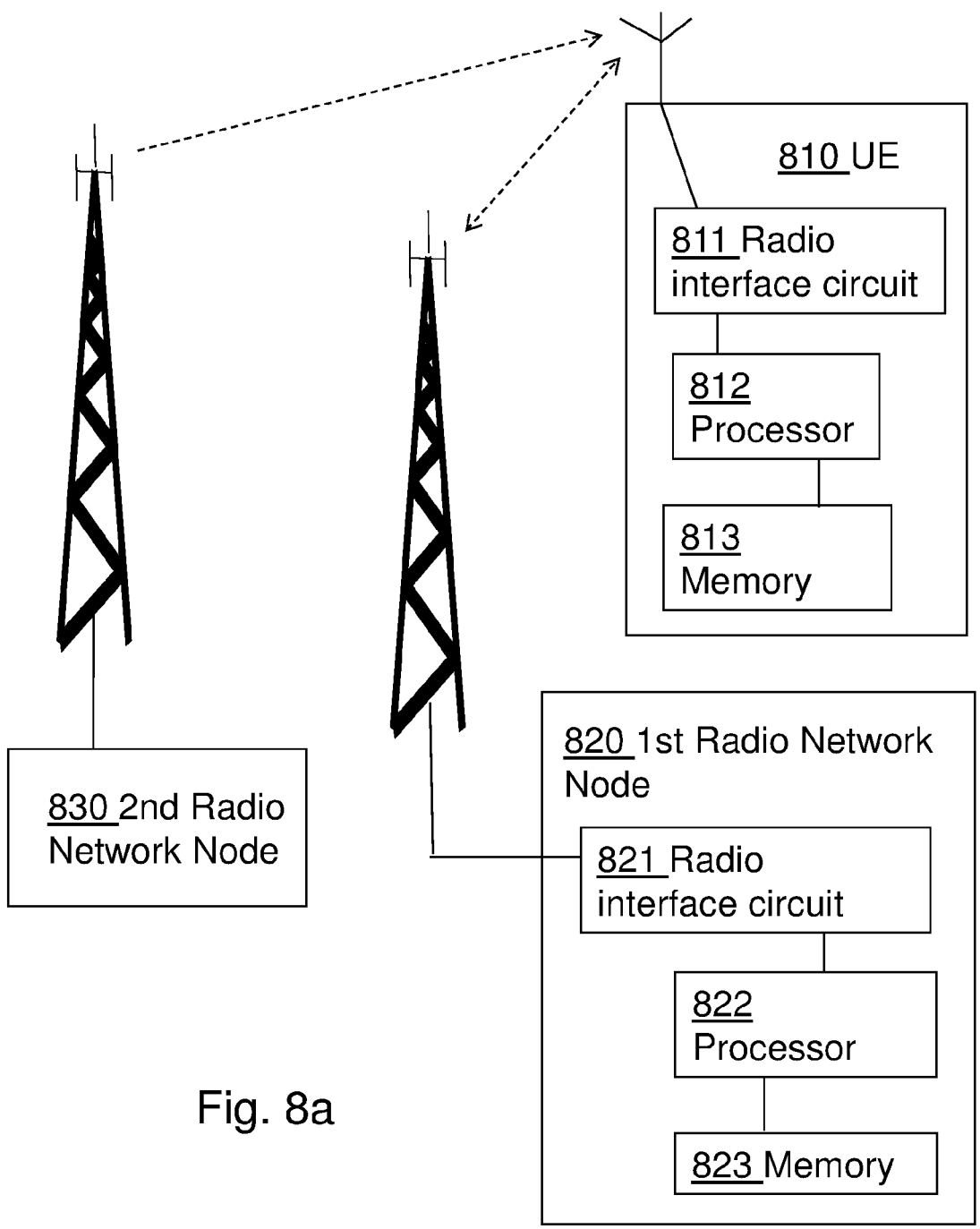
FIGS. 8a-b are block diagrams schematically illustrating the wireless device and the radio network node according to embodiments.

FIG. 7a is a flowchart illustrating one embodiment of a method for transmitting CQIs. The method is performed in a wireless device 810 served by a first radio network node 820 of a wireless communication network as illustrated in FIG. 8a. The method comprises:

710: Receiving a reference signal from the first radio network node 820,

720: Receiving information relating to an interfering transmission of a second radio network node 820 from the wireless communication network, 730: Estimating a first channel quality based on the reference signal, wherein the first channel quality indicates a channel quality for which the wireless device 810 has not cancelled the interfering transmission from the second radio network node 830, 740: Estimating a second channel quality based on the reference signal and on the information relating to the interfering transmission, wherein the second channel quality indicates a channel quality for which the wireless device 810 has cancelled the interfering transmission from the second radio network node 830, 750: Determining a first channel quality indicator based on the first channel quality and a second channel quality indicator based on the second channel quality, and 760 Transmitting the first and the second channel quality indicators to the first radio network node 820.

Figure 7B:
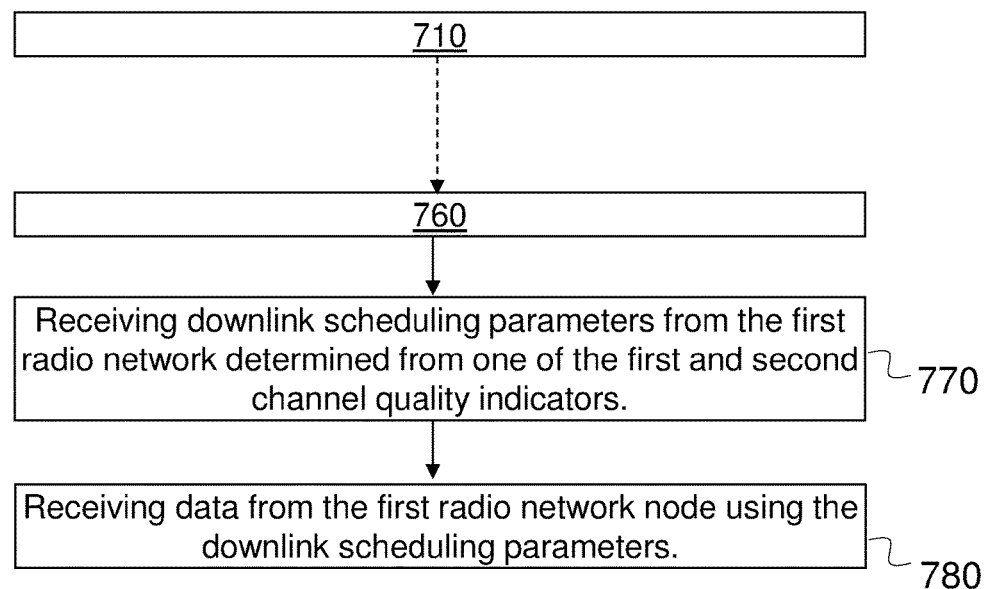

The method described in relation to FIG. 7a that is performed in the wireless device, may, as illustrated in FIG. 7b, optionally comprise:

770: Receiving downlink scheduling parameters from the first radio network determined from one of the first and second channel quality indicators, and 780: Receiving data from the first radio network node 810 using the downlink scheduling parameters.

In the embodiments of the method for transmitting channel quality indicators, the step of estimating 740 a second channel quality may comprise determining a cancellation efficiency value based on the information relating to an interfering transmission of a second radio network node 830, where the cancellation efficiency value reflecting to what extent the interfering transmission may be cancelled.

Further, the first and the second quality indicators may be transmitted 760 in a same transmission time interval, as is schematically illustrated in FIG. 6a. This corresponds at least in part to embodiment A above. Alternatively, the first channel quality indicator is transmitted in a first TTI and the second channel quality indicator is transmitted in a second transmission time interval, as is schematically illustrated in FIG. 6b. This corresponds at least in part to embodiment B above.

In one embodiment of the method for transmitting channel quality indicators, the wireless device 810 may be configured with a sequence for transmitting channel quality indicators of a first and a second type. The first channel quality indicator is of the first type and the second channel quality indicator is of the second type, and the first and the second channel quality indicators are transmitted 760 according to the sequence. This corresponds at least in part to embodiment B above. The sequence may define a repeated pattern of channel quality indicators of the first and the second types.

In the embodiments of the method for transmitting channel quality indicators, the second channel quality indicator may be transmitted in response to an order received from the first radio network node 820. Further, the first channel quality indicator may be transmitted in response to an order received from the first radio network node.

In one embodiment, the method further comprises repeatedly transmitting channel quality indicators of a first type in a continuous sequence and receiving control information from the wireless communication network with a request for interrupting the continuous sequence and continuing with transmitting one or more channel quality indicators of a second type. Additionally, the step of transmitting 760 the first and the second channel quality indicator to the first radio network node 820 further comprises transmitting the first channel quality indicator as a channel quality indicator of the first type, and transmitting the second channel quality indicator as a channel quality indicator of the second type according to the request in the control information. The transmissions of the channel quality indicators specified here correspond at least in part to embodiment C above.

In another embodiment, the method further comprises receiving control information comprising a first request for continuously transmitting channel quality indicators of a first type, and a second request for interrupting the continuously transmitting of channel quality indicators of the first type and continue with continuously transmitting channel quality indicators of a second type. Additionally, the step of transmitting 760 the first and the second channel quality indicator to the first radio network node 820 further comprises transmitting the first channel quality indicator as a channel quality indicator of the first type according to the first request in the control information, and transmitting the second channel quality indicator as a channel quality indicator of the second type according to the second request in the control information. The control information may further comprise a third request for interrupting the continuously transmitting of channel quality indicators of the second type and continue with continuously transmitting channel quality indicators of the first type. The transmissions of the channel quality indicators of the embodiment specified here correspond at least in part to embodiment C above.

In the above embodiments, the control information may be received via the first radio network node 820 and/or through RRC signalling. This corresponds at least in part to embodiment D above.

An embodiment of a wireless device 810 configured to be served by a first radio network node 820 of a wireless communication network is schematically illustrated in the block diagram in FIG. 8a. The wireless device 810 is configured to receive a reference signal from the first radio network node 820 and to receive information relating to an interfering transmission of a second radio network node 830 from the wireless communication network. The wireless device 810 is also configured to estimate a first channel quality based on the reference signal, and the first channel quality indicates a channel quality for which the wireless device 810 has not cancelled the interfering transmission from the second radio network node 830. It is also configured to estimate a second channel quality based on the reference signal and on the information relating to the interfering transmission and the second channel quality indicates a channel quality for which the wireless device 810 has cancelled the interfering transmission from the second radio network node 830. The wireless device 810 is further configured to determine a first channel quality indicator based on the first channel quality and a second channel quality indicator based on the second channel quality, and to transmit the first and the second channel quality indicators to the first radio network node 820.

The wireless device 810 described in relation to FIG. 8*a* may optionally be configured to receive downlink scheduling parameters from the first radio network determined from one of the first and second channel quality indicators, and to receive data from the first radio network node 820 using the downlink scheduling parameters.

In one embodiment, the wireless device 810 may further be configured to determine a cancellation efficiency value based on the information relating to an interfering transmission of a second radio network node 830 when estimating the second channel quality and the cancellation efficiency value may reflect to what extent the interfering transmission may be cancelled.

In the embodiments of the wireless device 810, it may be configured to transmit the first and the second quality indicators in the same transmission time interval, as is schematically illustrated in FIG. 6*a*. This corresponds at least in part to embodiment A above. Alternatively, the wireless device may be configured to transmitting the first channel quality indicator in a first transmission time interval and the second channel quality indicator in a second transmission time interval, as is schematically illustrated in FIG. 6*b*. This corresponds at least in part to embodiment B above.

The wireless device 810 may further be configured with a sequence for transmitting channel quality indicators of a first and a second type, wherein the first channel quality indicator is of the first type and the second channel quality indicator is of the second type, and wherein the wireless device is further configured to transmitting the first and the second channel quality indicators are according to the sequence. This corresponds at least in part to embodiment B above.

In the embodiments of the wireless device 810, it may further be configured to transmit the second channel quality indicator in response to an order received from the first radio network node 820. Additionally, the wireless device 810 may be configured to transmit the first channel quality indicator in response to an order received from the first radio network node 820. The transmissions specified here correspond at least in part to embodiment C above.

In embodiments of the invention, the wireless device 810 comprises a processor 812 and a memory 813. The wireless device 810 may also comprise a radio interface circuit 811 configured to communicate with the first radio network node 820. The memory 813 contains instructions executable by the processor 812, whereby the wireless device 810 is operative to receive a reference signal from the first radio network node 820 and to receive information relating to an interfering transmission of a second radio network node 830 from the wireless communication network. Further, the wireless device 810 is operative to estimate a first channel quality based on the reference signal, wherein the first channel quality indicates a channel quality for which the wireless device 810 has not cancelled the interfering transmission from the second radio network node 830, and to estimate a second channel quality based on the reference signal and on the information relating to the interfering transmission, wherein the second channel quality indicates a channel quality for which the wireless device 810 has cancelled the interfering transmission from the second radio network node 830. Additionally, the wireless device 810 is operative to determine a first channel quality indicator based on the first channel quality and a second channel quality indicator based on the second channel quality, and to transmit the first and the second channel quality indicators to the first radio network node 820.

The wireless device 810 may further be operative to perform the method according to the embodiments disclosed in relation to FIGS. 6*a* and 6*b*.

Figure 8B:
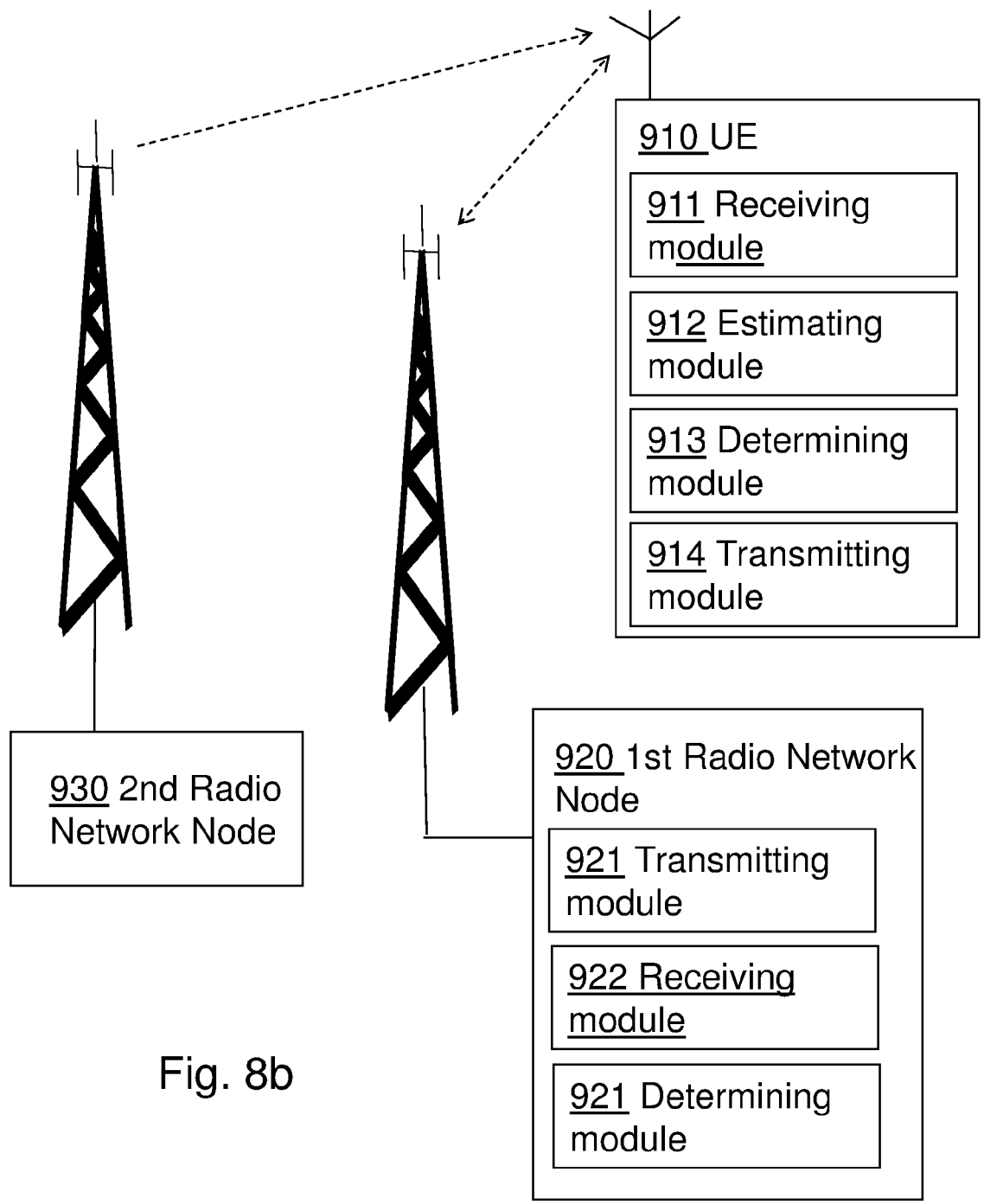

In an alternative way to describe the embodiment in FIG. 8*a*, illustrated in FIG. 8*b*, the wireless device 910 comprises a receiving module 911 adapted to receive a reference signal from the first radio network node 920 and to receive information relating to an interfering transmission of a second radio network node 930 from the wireless communication network. The wireless device further comprises an estimating module 912 adapted to estimate a first channel quality based on the reference signal, wherein the first channel quality indicates a channel quality for which the wireless device 910 has not cancelled the interfering transmission from the second radio network node 930, and to estimate a second channel quality based on the reference signal and on the information relating to the interfering transmission, wherein the second channel quality indicates a channel quality for which the wireless device 910 has cancelled the interfering transmission from the second radio network node 930. Additionally, the wireless device comprises a determining module 913 adapted to determine a first channel quality indicator based on the first channel quality and a second channel quality indicator based on the second channel quality, and a transmitting module 914 adapted to transmit the first and the second channel quality indicators to the first radio network node 920.

Figure 9A:
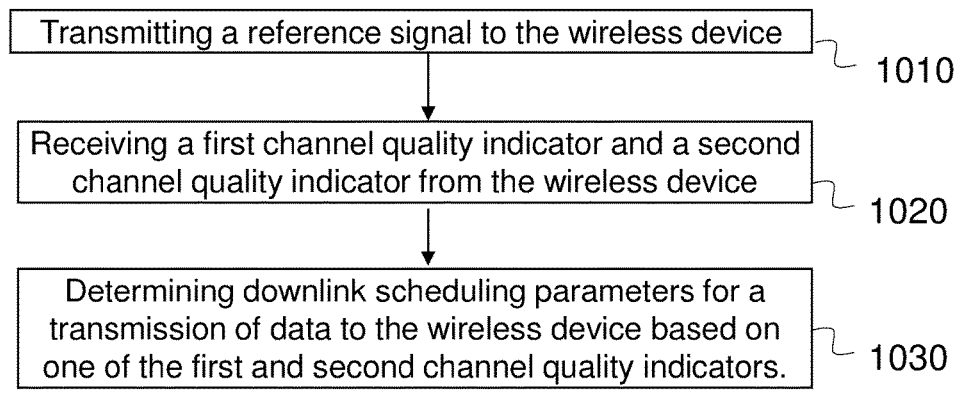
FIGS. 9a-b are flow-charts illustrating the method performed in the first radio network node according to the embodiments.

FIG. 9*a* is a flowchart illustrating an embodiment of a method for determining downlink scheduling parameters for a transmission of data to a wireless device 810 provided with information relating to an interfering transmission of a second radio network node 830. The method is performed in a first radio network node 810 of a wireless communication network serving the wireless device 810 and comprises:

1010: Transmitting a reference signal to the wireless device 810,

1020: Receiving a first channel quality indicator and a second channel quality indicator from the wireless device 810, wherein the first channel quality indicator is based on the reference signal and indicates a channel quality for which the wireless device 810 has not cancelled the interfering transmission from the second radio network node 830, and the second channel quality indicator is based on the reference signal and on the information relating to the interfering transmission and indicates a channel quality for which the wireless device 810 has cancelled the interfering transmission from the second radio network node 830, and

1030: Determining downlink scheduling parameters for a transmission of data to the wireless device 810 based on one of the first and second channel quality indicators.

Figure 9B:
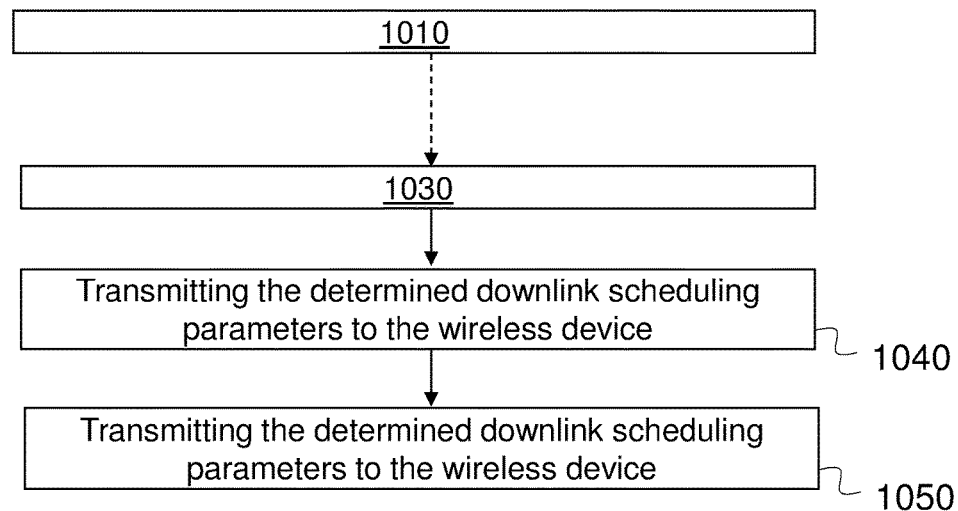

The method described in relation to FIG. 9a that is performed in the first radio network node 820, may optionally comprise as illustrated in FIG. 9b:

1040: Transmitting the determined downlink scheduling parameters to the wireless device 810, and

1050: Transmitting the data to the wireless device 810 using the downlink scheduling parameters.

In the embodiments of the method for determining downlink scheduling parameters, the step of determining 1030 downlink scheduling parameters may comprise determining if network assisted interference cancellation is to be applied or not, and wherein the downlink scheduling parameters are based on the first channel quality indicator if it is determined not to apply network assisted interference cancellation and on the second channel quality indicator if it is determined to apply network assisted interference cancellation.

Further, the first and the second quality indicators are received 1020 in a same transmission time interval. This corresponds at least in part to embodiment A above. Alternatively, the first channel quality indicator is received in a first transmission time interval and the second channel quality indicator is received in a second transmission time interval.

In one embodiment, the first radio network node 810 may be configured with a sequence for receiving channel quality indicators of a first and a second type, wherein the first channel quality indicator is of the first type and the second channel quality indicator is of the second type, and wherein the first and the second channel quality indicators are received 1020 according to the sequence. The sequence may define a repeated pattern of channel quality indicators of the first and the second types. This corresponds at least in part to embodiment B above.

The second channel quality indicator may be received in response to an order transmitted to the wireless device 810. Additionally, the first channel quality indicator may be received in response to an order transmitted to the wireless device 810. This corresponds at least in part to embodiment C above.

In one embodiment of the method performed in the first radio network node, the method further comprises repeatedly receiving channel quality indicators of a first type in a continuous sequence, transmitting control information to the wireless device with a request for interrupting the continuous sequence and continuing with transmitting one or more channel quality indicators of a second type. Additionally, the step of receiving 1020 the first channel quality indicator and the second channel quality indicator from the wireless device further comprises receiving the first channel quality indicator as a channel quality indicator of the first type, and receiving the second channel quality indicator as a channel quality indicator of the second type according to the request in the control information. This embodiment corresponds at least in part to embodiment C above.

In another embodiment of the method performed in the first radio network node, the method further comprises transmitting control information to the wireless device comprising a first request for continuously transmitting channel quality indicators of a first type, and a second request for interrupting the continuously transmitting of channel quality indicators of the first type and continue with continuously transmitting channel quality indicators of a second type. The step of receiving 1020 the first channel quality indicator and the second channel quality indicator from the wireless device further comprises receiving the first channel quality indicator as a channel quality indicator of the first type according to the first request in the control information, and receiving the second channel quality indicator as a channel quality indicator of the second type according to the second request in the control information. The control information may comprise a third request for interrupting the continuously transmitting of channel quality indicators of the second type and continue with continuously transmitting channel quality indicators of the first type. The transmissions of the channel quality indicators of the embodiment specified here correspond at least in part to embodiment C above.

In the above embodiments, the control information may be received via the first radio network node 820 and/or through Radio Resource Control signalling. This corresponds at least in part to embodiment D above.

An embodiment of a first radio network node 820 for a wireless communication network configured to serve a wireless device 810 provided with information relating to an interfering transmission of a second radio network node 830 is schematically illustrated in the block diagram in FIG. 8a. The first radio network node 820 is configured to transmit a reference signal to the wireless device 810, and to receive a first channel quality indicator and a second channel quality indicator from the wireless device 810, wherein the first channel quality indicator is based on the reference signal and indicates a channel quality for which the wireless device 810 has not cancelled the interfering transmission from the second radio network node 830, and the second channel quality indicator is based on the reference signal and on the information relating to the interfering transmission and indicates a channel quality for which the wireless device 810 has cancelled the interfering transmission from the second radio network node 830. The first radio network node 820 is further configured to determine downlink scheduling parameters for a transmission of data to the wireless device 810 based on one of the first and second channel quality indicators.

The first radio network node 820 described in relation to FIG. 8a may optionally be configured to transmit the determined downlink scheduling parameters to the wireless device 810, and to transmit the data to the wireless device 810 using the downlink scheduling parameters.

In one embodiment the first radio network node 820 is further configured to determine if network assisted interference cancellation is to be applied or not when determining downlink scheduling parameters, and wherein the downlink scheduling parameters are based on the first channel quality indicator if it is determined not to apply network assisted interference cancellation and on the second channel quality indicator if it is determined to apply network assisted interference cancellation.

In the embodiments of the first radio network node 820, it may be configured to receive the first and the second quality indicators in a same transmission time interval. Alternatively, the first radio network node 820 may be configured to receive the first channel quality indicator in a first transmission time interval and the second channel quality indicator is received in a second transmission time interval.

The first radio network may be configured with a sequence for receiving channel quality indicators of a first and a second type, wherein the first channel quality indicator is of the first type and the second channel quality indicator is of the second type, and wherein the first and the second channel quality indicators are received according to the sequence.

In the embodiments of the first radio network node 820, it may further be configured to receive the second channel quality indicator in response to an order transmitted to the wireless device 810. Additionally, the first radio network node 820 may be configured to receive the first channel quality indicator in response to an order transmitted to the wireless device 810.

In embodiments of the invention, the first radio network node 820 comprises a processor 822 and a memory 823. The first radio network node 820 may also comprise a radio interface circuit 821 configured to communicate with the wireless device 810. The memory 823 contains instructions executable by the processor 822, whereby the first radio network node 810 is operative to transmit a reference signal to the wireless device 810, to receive a first channel quality indicator and a second channel quality indicator from the wireless device 810, wherein the first channel quality indicator is based on the reference signal and indicates a channel quality for which the wireless device has not cancelled the interfering transmission from the second radio network node 830, and the second channel quality indicator is based on the reference signal and on the information relating to the interfering transmission and indicates a channel quality for which the wireless device has cancelled the interfering transmission from the second radio network node 830, and to determine downlink scheduling parameters for a transmission of data to the wireless device 810 based on one of the first and second channel quality indicators.

In an alternative way to describe the embodiment of a first radio network node 820 in FIG. 8a, illustrated in FIG. 8b, the first radio network node 920 comprises a transmitting module 921 adapted to transmit a reference signal to the wireless device, and a receiving module 922 adapted to receive a first channel quality indicator and a second channel quality indicator from the wireless device 910, wherein the first channel quality indicator is based on the reference signal and indicates a channel quality for which the wireless device has not cancelled the interfering transmission from the second radio network node 930, and the second channel quality indicator is based on the reference signal and on the information relating to the interfering transmission and indicates a channel quality for which the wireless device has cancelled the interfering transmission from the second radio network node 930. The first radio network node 920 further comprises a determining module adapted to determine downlink scheduling parameters for a transmission of data to the wireless device based on one of the first and second channel quality indicators.

The invention claimed is:

1. A method for transmitting channel quality indicators, the method being performed in a wireless device served by a first radio network node of a wireless communication network, the method comprising:
   receiving a reference signal from the first radio network node;
   receiving information relating to an interfering transmission of a second radio network node from the wireless communication network;
   estimating a first channel quality based on the reference signal, wherein the first channel quality indicates a channel quality for which the wireless device has not cancelled the interfering transmission of the second radio network node;
   estimating a second channel quality based on the reference signal and on the information relating to the interfering transmission, wherein the second channel quality indicates a channel quality for which the wireless device has cancelled the interfering transmission of the second radio network node;
   determining a first channel quality indicator based on the first channel quality and determining a second channel quality indicator based on the second channel quality;
   transmitting one of the first and the second channel quality indicators to the first radio network node;
   receiving control information from the first radio network node, wherein the received control information comprises a request for: interrupting the transmission of the one of the first and the second channel quality indicators, and continuing transmission of another one of the first and the second channel quality indicators; and
   transmitting the other one of the first and the second channel quality indicators, to the first radio network node, in response to the request in the received control information.

2. The method of claim 1, wherein the method further comprises:
   receiving downlink scheduling parameters from the first radio network node, determined from the other one of the first and the second channel quality indicators; and
   receiving data from the first radio network node using the downlink scheduling parameters.

3. The method of claim 1, wherein the step of estimating the second channel quality comprises: determining a cancellation efficiency value based on the information relating to the interfering transmission of the second radio network node, the cancellation efficiency value reflecting to what extent the interfering transmission is to be cancelled.

4. A method for determining downlink scheduling parameters for a transmission of data to a wireless device provided with information relating to an interfering transmission of a second radio network node, the method being performed in a first radio network node of a wireless communication network serving the wireless device, the method comprising:
   transmitting a reference signal to the wireless device;
   receiving one of a first channel quality indicator and a second channel quality indicator from the wireless device;
   transmitting control information to the wireless device, wherein the transmitted control information comprises a request for: interrupting transmission of the one of the first channel quality indicator and the second channel quality indicator, and continuing transmission of another one of the first channel quality indicator and the second channel quality indicator;
   receiving the other one of the first channel quality indicator and the second channel quality indicator, from the wireless device, in response to the request in the transmitted control information,
   wherein the first channel quality indicator is based on the reference signal and indicates a channel quality for which the wireless device has not cancelled the interfering transmission of the second radio network node, and wherein the second channel quality indicator is based on the reference signal and on the information relating to the interfering transmission and the second channel quality indicator indicates a channel quality for which the wireless device has cancelled the interfering transmission of the second radio network node; and
   determining the downlink scheduling parameters for the transmission of data to the wireless device based on the other one of the first channel quality indicator and the second channel quality indicator.

5. The method of claim 4, wherein the method further comprises:
transmitting the determined downlink scheduling parameters to the wireless device; and
transmitting the data to the wireless device using the determined downlink scheduling parameters.

6. The method of claim 4, wherein the step of determining the downlink scheduling parameters comprises: determining if network assisted interference cancellation is to be applied or not, and wherein the downlink scheduling parameters are determined based on:
the first channel quality indicator if it is determined not to apply the network assisted interference cancellation, and
the second channel quality indicator if it is determined to apply the network assisted interference cancellation.

7. A wireless device configured to be served by a first radio network node of a wireless communication network, and to:
receive a reference signal from the first radio network node;
receive information relating to an interfering transmission of a second radio network node from the wireless communication network;
estimate a first channel quality based on the reference signal, wherein the first channel quality indicates a channel quality for which the wireless device has not cancelled the interfering transmission of the second radio network node;
estimate a second channel quality based on the reference signal and on the information relating to the interfering transmission, wherein the second channel quality indicates a channel quality for which the wireless device has cancelled the interfering transmission of the second radio network node;
determine a first channel quality indicator based on the first channel quality and determine a second channel quality indicator based on the second channel quality;
transmit one of the first and the second channel quality indicators to the first radio network node;
receive control information from the first radio network node, wherein the received control information comprises a request to: interrupt the transmission of the one of the first and the second channel quality indicators, and continue transmission of another one of the first and the second channel quality indicators; and
transmit the other one of the first and the second channel quality indicators, to the first radio network node, in response to the request in the received control information.

8. The wireless device of claim 7, further configured to:
receive downlink scheduling parameters from the first radio network node, determined from the other one of the first and the second channel quality indicators; and
receive data from the first radio network node using the downlink scheduling parameters.

9. The wireless device of claim 7, further configured to determine a cancellation efficiency value based on the information relating to the interfering transmission of the second radio network node when estimating the second channel quality, the cancellation efficiency value reflecting to what extent the interfering transmission is to be cancelled.

10. A first radio network node for a wireless communication network configured to serve a wireless device provided with information relating to an interfering transmission of a second radio network node, the first radio network node being configured to:
transmit a reference signal to the wireless device;
receive one of a first channel quality indicator and a second channel quality indicator from the wireless device;
transmit control information to the wireless device, wherein the transmitted control information comprises a request to: interrupt transmission of the one of the first channel quality indicator and the second channel quality indicator, and continue transmission of another one of the first channel quality indicator and the second channel quality indicator;
receive the other one of the first channel quality indicator and the second channel quality indicator, from the wireless device, in response to the request in the transmitted control information,
wherein the first channel quality indicator is based on the reference signal and indicates a channel quality for which the wireless device has not cancelled the interfering transmission of the second radio network node, and wherein the second channel quality indicator is based on the reference signal and on the information relating to the interfering transmission and the second channel quality indicator indicates a channel quality for which the wireless device has cancelled the interfering transmission of the second radio network node; and
determine downlink scheduling parameters for a transmission of data to the wireless device based on the other one of the first channel quality indicator and the second channel quality indicator.

11. The first radio network node of claim 10, further configured to:
transmit the determined downlink scheduling parameters to the wireless device; and
transmit the data to the wireless device using the determined downlink scheduling parameters.

12. The first radio network node of claim 10, further configured to determine if network assisted interference cancellation is to be applied or not when determining the downlink scheduling parameters, and wherein the downlink scheduling parameters are determined based on:
the first channel quality indicator if it is determined not to apply the network assisted interference cancellation, and
the second channel quality indicator if it is determined to apply the network assisted interference cancellation.

* * * * *